United States Patent
Gose et al.

(10) Patent No.: US 11,353,420 B2
(45) Date of Patent: Jun. 7, 2022

(54) OXYGEN SENSOR SYSTEM AND METHOD

(71) Applicant: DELPHI TECHNOLOGIES IP LIMITED, St. Michael (BB)

(72) Inventors: Mark W. Gose, Kokomo, IN (US);
Jerry W. Campbell, Carmel, IN (US);
Eugene V. Ripley, Russiaville, IN (US);
Marc R. Engelhardt, Kokomo, IN (US); Jingyi Hou, Westfield, IN (US)

(73) Assignee: DELPHI TECHNOLOGIES IP LIMITED, St. Michael (BB)

(*) Notice: Subject to any disclaimer, the term of this patent is extended or adjusted under 35 U.S.C. 154(b) by 263 days.

(21) Appl. No.: 16/599,663

(22) Filed: Oct. 11, 2019

(65) Prior Publication Data

US 2021/0109057 A1  Apr. 15, 2021

(51) Int. Cl.
*G01N 27/41* (2006.01)
*G01N 27/406* (2006.01)

(52) U.S. Cl.
CPC .......... *G01N 27/41* (2013.01); *G01N 27/4065* (2013.01)

(58) Field of Classification Search
CPC ....... G01N 27/4065; G01N 27/406–41; G01N 33/0004–0075
See application file for complete search history.

(56) References Cited

U.S. PATENT DOCUMENTS

| | | | |
|---|---|---|---|
| 5,444,435 A * | 8/1995 | Williams, II | G01N 33/0052 324/464 |
| 6,096,186 A | 8/2000 | Warburton | |
| 6,214,209 B1 | 4/2001 | Gruenwald | |
| 6,289,719 B1 * | 9/2001 | Bloemer | G01N 27/4065 204/424 |
| 7,444,235 B2 | 10/2008 | Anilovich et al. | |
| 9,297,843 B2 | 3/2016 | Gibson et al. | |
| 2005/0096806 A1 | 5/2005 | Diem | |
| 2009/0205957 A1 * | 8/2009 | Hada | G01N 27/4071 204/406 |
| 2011/0012630 A1 * | 1/2011 | Bevot | G01N 27/4062 324/750.02 |
| 2012/0285838 A1 * | 11/2012 | Liemersdorf | G01N 27/406 205/784 |
| 2014/0076741 A1 * | 3/2014 | Adams | G01N 27/4163 205/785.5 |
| 2016/0082390 A1 * | 3/2016 | Nakano | F01N 13/008 700/271 |

(Continued)

*Primary Examiner* — Joshua L Allen
(74) *Attorney, Agent, or Firm* — Bookoff McAndrews, PLLC; Joshua M Haines

(57) ABSTRACT

An oxygen sensor is in a system including compensator circuitry connected to the oxygen sensor. The oxygen sensor includes a pump cell and the compensator circuitry includes a feedback control loop which includes a digital compensator which determines and outputs a compensation current to the pump cell or adjusts a pump cell voltage. A method of controlling the oxygen sensor includes, subsequent to a period of time when the feedback control loop is disrupted, pumping a balancing current into or out the pump cell for a balancing time interval, the balancing current and/or the balancing time interval is dependent on a current pumped into or out of the pump cell prior to the feedback control loop being disrupted.

16 Claims, 6 Drawing Sheets

(56) References Cited

U.S. PATENT DOCUMENTS

| | | | |
|---|---|---|---|
| 2016/0195885 A1* | 7/2016 | Glenn | H03K 17/102 |
| | | | 323/268 |
| 2016/0327512 A1* | 11/2016 | Reinhardt | G01N 27/4065 |
| 2016/0356196 A1* | 12/2016 | Nakano | F01N 3/208 |
| 2018/0164226 A1 | 6/2018 | Wizmann et al. | |
| 2018/0202986 A1 | 7/2018 | Knoefler et al. | |
| 2020/0144637 A1 | 5/2020 | Wagner | |
| 2020/0166475 A1* | 5/2020 | Kondo | G01N 33/0054 |

* cited by examiner

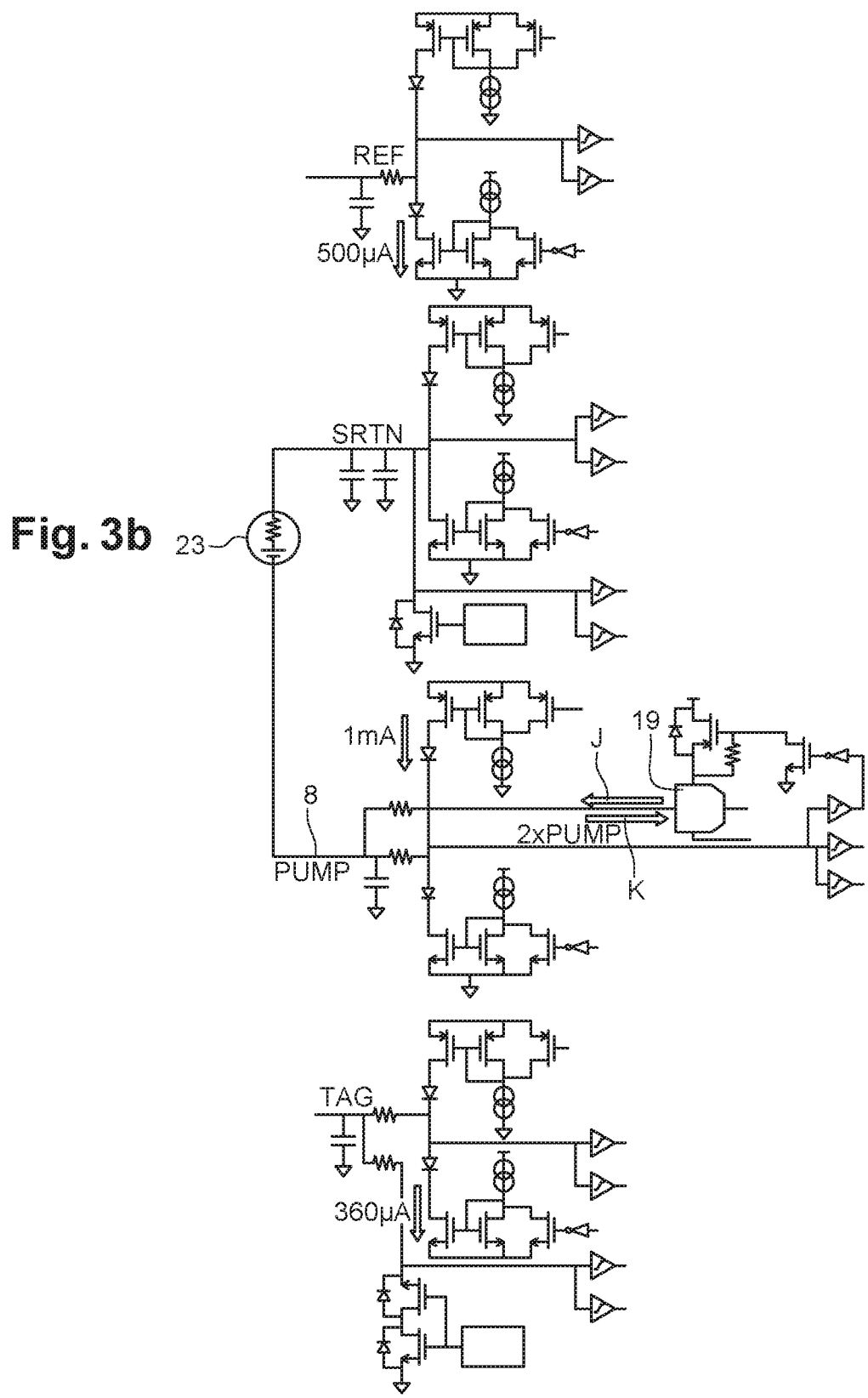

OXYGEN SENSOR SYSTEM AND METHOD

TECHNICAL FIELD OF INVENTION

This disclosure relates to oxygen (O2) sensors and systems using such sensors, and typically such sensors used in vehicle systems to determine oxygen levels in e.g. exhausts. Such sensors are often referred to as lambda sensors. The disclosure has application to both two-cell and one-cell lambda sensors.

BACKGROUND OF INVENTION

Typically, an O2 sensor is mounted in the exhaust manifold to monitor how much unburned oxygen is in the exhaust as the exhaust gases exit the engine. Monitoring oxygen levels in the exhaust is a way of gauging the fuel mixture.

A lambda sensor is based on a solid-state electrochemical fuel cell. Its electrodes provide an output voltage corresponding to the quantity of oxygen in the exhaust relative to that in the atmosphere.

The measurement or reference cell is arranged in contact with the outside air externally and on the other side to the measurement chamber. Opposite to the measurement cell is a pump cell, adapted to pump oxygen into or out of the measurement chamber by means of an electric current. A small amount of exhaust gas can flow into the measurement chamber via a small channel. A change of oxygen concentration in the measurement chamber, consequently changes the measurement or reference cell voltage from its reference value of e.g. 450 mV. To return the measurement cell reference voltage back to 450 mV, current is sent through the pump cell. Depending on the direction and amount of current, oxygen ions can be pumped into or out of the measurement chamber to return the measurement cell voltage to 450 mV.

A control loop as part of an O2 sensor interface circuitry such as an interface IC, connected between the sensor and microprocessor, regulates the reference cell voltage by adjusting the pump current.

Periodically, a diagnostic routine needs to run to test the connections of the sensor to the interface IC, e.g. to check for ground faults. A problem with this is that there is disruption to the system, such as the closed loop control is disrupted and charge values of the cells of the sensor are disrupted.

There are two primary causes of the disruption. In a first cause, this is due to the opening of the pump control loop during the diagnostic period. While the pump loop is opened, the pump current required to maintain the desired reference cell voltage is not available so the sensor deviates from its desired operating point. After the diagnostic is complete, the loop is closed again, but the error accumulated on the cells during the diagnostic causes a disturbance in the control loop.

The other cause is due to the open circuit diagnostic mechanism. During the diagnostic, normal operation of the interface is suspended, the return line of the sensor (SRTN) is pulled high and the reference cell, tag resistor, and pump cell interfaces are pulled low. This action causes charge to be pulled out of the reference cell and the pump cells. When the diagnostic is complete, pump current readings do not reflect actual gas conditions until the charge removed during the diagnostic is restored. It takes time for the control loop to bring the sensor back to proper operation.

It is an object of the invention to overcome these problems.

SUMMARY OF THE INVENTION

Briefly described, a method is provided for controlling an oxygen sensor in a system including compensator circuitry connected to the oxygen sensor. The oxygen sensor includes a pump cell and the compensator circuitry includes a feedback control loop which includes a digital compensator configured to determine and output a compensation current to the pump cell or adjust a pump cell voltage. The method comprises, subsequent to a period of time when the feedback control loop is disrupted, pumping a balancing current into or out the pump cell for a balancing time interval, the balancing current and/or the balancing time interval being dependent on a current pumped into or out of the pump cell prior to the feedback control loop being disrupted.

A system is also provided which comprises an oxygen sensor including a pump cell. The system also comprises compensator circuitry connected to the oxygen sensor, and including a feedback control loop which includes a digital compensator configured to determine and output a compensation current to the pump cell or adjust a pump cell voltage. The compensator circuitry is configured to, subsequent to a period of time when the feedback control loop is disrupted, pump a balancing current into or out the pump cell for a balancing time interval, the balancing current and/or the time interval being dependent on a current pumped into or out of the pump cell prior to the feedback control loop being disrupted.

BRIEF DESCRIPTION OF DRAWINGS

The present invention is now described by way of example with reference to the accompanying drawings in which:

FIGS. 3a and 3b illustrate examples of the invention; and

DETAILED DESCRIPTION OF INVENTION

Background

As mentioned, a lambda sensor is based on a solid-state electrochemical fuel cell. Its two electrodes provide an output signal corresponding to the quantity of oxygen in the exhaust relative to that in the atmosphere.

In one system, a measurement or reference cell is arranged in contact with the outside air externally and on the other side to the measurement chamber. Opposite to the measurement cell is a pump cell, adapted to pump oxygen into or out of the measurement chamber by means of an electric current. A small amount of exhaust gas can flow into the measurement chamber via a small channel. A change of oxygen concentration in the measurement chamber, consequently changes the measurement or reference cell voltage from its reference value of e.g. 450 mV. To return the measurement cell reference voltage back to 450 mV, current is sent through the pump cell. Depending on the direction and amount of current, oxygen ions can be pumped into or out of the measurement chamber to return the measurement cell voltage to 450 mV. A control loop as part of an O2 sensor interface circuitry such as an interface IC, connected between the sensor and microprocessor, regulates the reference cell voltage by adjusting the pump current.

Figure 1A:
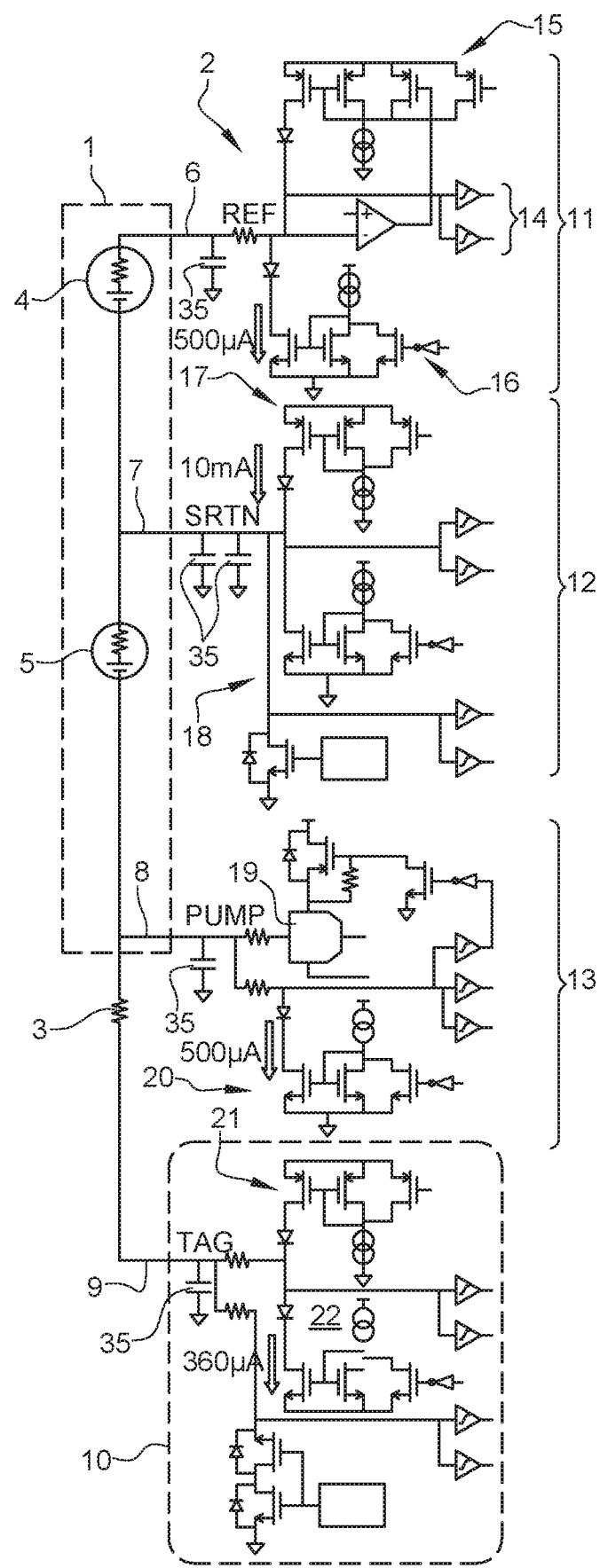
FIG. 1a shows a schematic representation of a portion of a 2-cell O2 sensor system.

FIG. 1a shows a schematic representation of a portion of an O2 sensor system showing salient portions relevant to aspects of the invention. The sensor shown is a 2-cell O2 sensor 1, connected to sensor interface IC or circuitry 2; this is typically connected between the sensor and a general controlling microprocessor (not shown).

The sensor (element) is shown schematically but includes a reference (REF) or measurement cell 4 and a pump cell 5. The two cells are separated on sides by a porous diffusion component 6 (which provides/defines a porous diffusion passage) so as to form a gas detecting cavity. Electrodes are located on either side of the cells and provide appropriate input and outputs to the other parts (circuitry) of the system as shown.

The oxygen sensor is connected to associated diagnostic circuitry 2 which may comprise intermediate circuitry (generally designated with reference numeral 2) between the sensor itself and a microprocessor, via three lines. Line 6 is the REF terminal, line 7 is the SRTN terminal which is common to appropriate terminals (electrodes) on both the pump and reference cells, and line 8 is the PUMP terminal. Lines 6, 7 and 8 are connected to associated circuitry designated 11, 12 and 13 respectively.

In the figure is additionally shown a TAG resistor 3 and TAG line 9 to TAG circuitry 10 which again can be considered or embodied as part of the intermediates or associated circuitry. This is an optional feature and the TAG set-up is commonly used to trim out sensor variations.

The circuitry connected to the REF terminal generally provides outputs 14 (after appropriate amplifications) which are used to compare the output to defined threshold voltages for determining shorts to ground or open circuit conditions. Connected to the REF line 6 is provided pull-up circuitry generally designated 15 and pull down circuitry generally designated 16.

Regarding the SRTN line 7, this generally is used to control the sensor in a way as to e.g. change the potential of the relevant terminals of the pump and reference cells during and between various processes such as measurement, testing, resetting and diagnostic process. It also allows the sensor common to be disconnected from ground in the event of a short to battery on one of the sensor wires. Generally provided for this is pull-up circuitry 17 and pull down circuitry 18. It should be noted that this circuitry can be controlled by the microprocessor.

The pump cell line 8 is connected to circuitry which provides a current to be supplied to the pump cell dependent on the output of the REF line 6 and its subsequent comparison to the standard 450 mV. The pump current is provided as an output of a digital to analog converter (DAC) 19. Circuitry which provided the input to the DAC is not shown, but essentially this comprises mainly (includes) a digital compensator which may be programmable and provides an output to the DAC dependent on the comparison. Pull-down circuitry 20 is provided as shown.

The TAG circuitry includes pull up and pull down circuitry 21 and 22 respectively.

Figure 1B:
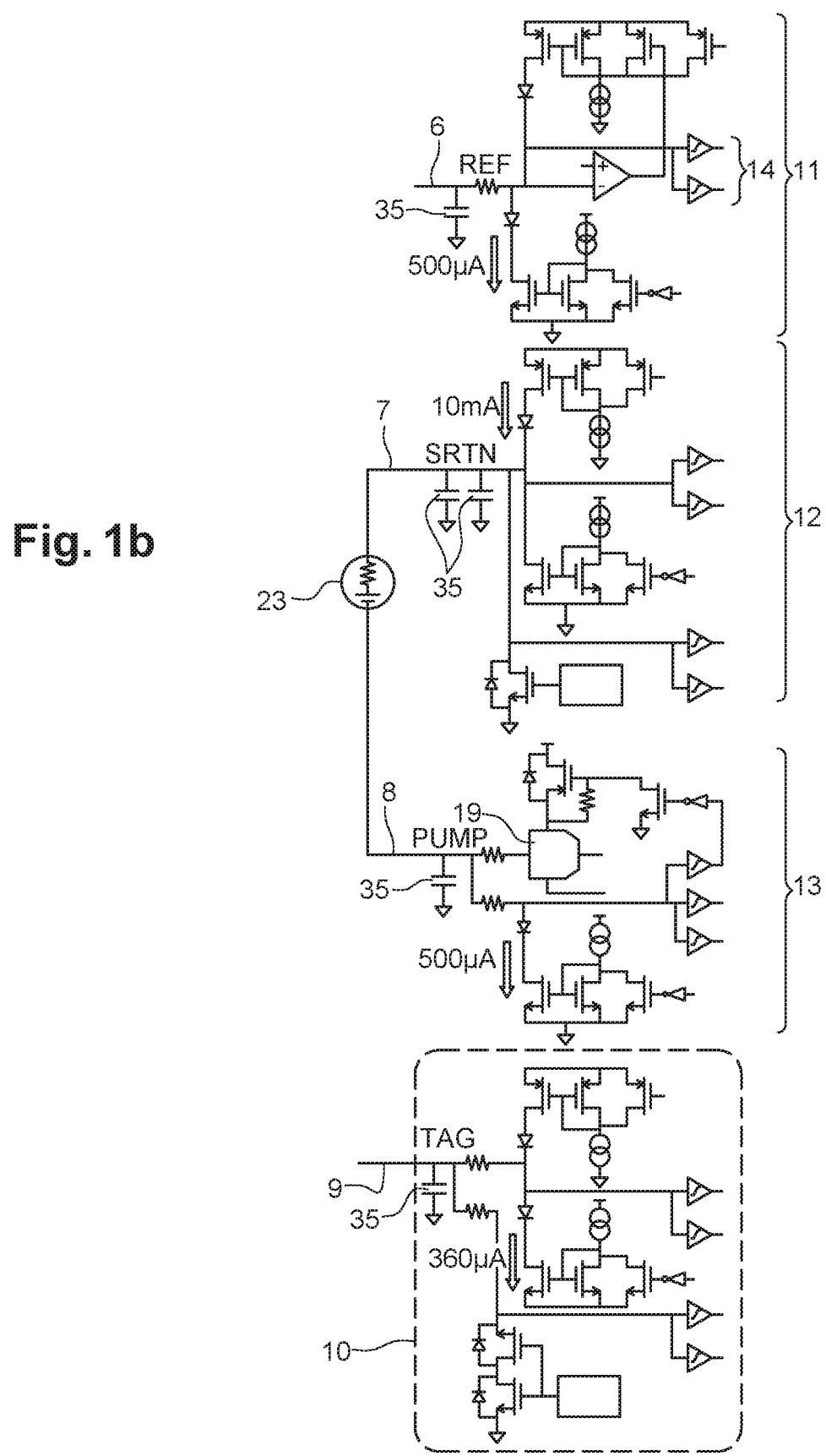
FIG. 1b shows a schematic representation of a portion of a 1-cell O2 sensor system.

FIG. 1b shows similar circuitry for a 1-cell sensor 23.

Capacitors 35 are connected to the REF, SRTN, PUMP and TAG lines.

During diagnostic testing, the following procedure may take place.

a) First, the power switch in the SRTN circuitry is switched off.

b) Thereafter current into the sensor terminals is applied by the pull up circuitry 15, 17, 21 along with current DAC 19. This is designed to pull the signals up to ~+5V, i.e. raise all the lines REF, SRTN, PUMP and TAG. The voltages on these sensor lines are compared to predefined thresholds via outputs 14 for the purpose of short to ground testing. Here, the current level for each pin is chosen to charge the capacitor on each respective pin at the same rate to minimize current flowing into the REF and PUMP cells.

c) Thereafter, the pull up circuitry 17 is left on to keep SRTN at around +5V and the pulldown circuits 16, 20, 22 are turned on acting as current sinks. If the sensor is at operating temperature and the sensor lines are not open, the current sinks will not be able to pull the REF, PUMP, or TAG lines down due to the low impedance of the sensor. The sensor line voltages are compared to predefined thresholds by outputs 14 to detect an open connection.

In the operation of wide-range oxygen sensors, diagnostic tests cause a disruption in the operating point of the sensor, consequently resulting in errors in the indicated air/fuel ratio. Though some specifics differ, the disruption occurs in both one-cell and two-cell sensors.

Problem

A primary cause of the disruption is due to the opening of the pump/reference control loop during the diagnostic period. While the pump/reference control loop is open, the pump is no longer receiving the current it requires to maintain the reference cell at the desired 450 mV. This will cause the reference cell to drift from its desired value in a direction dependent on the oxygen content in the exhaust gas causing the sensor to become out of balance. After the diagnostic is complete, the loop is closed again, but the error accumulated on the cells during the diagnostic causes a disturbance in the control loop.

Figure 2A:
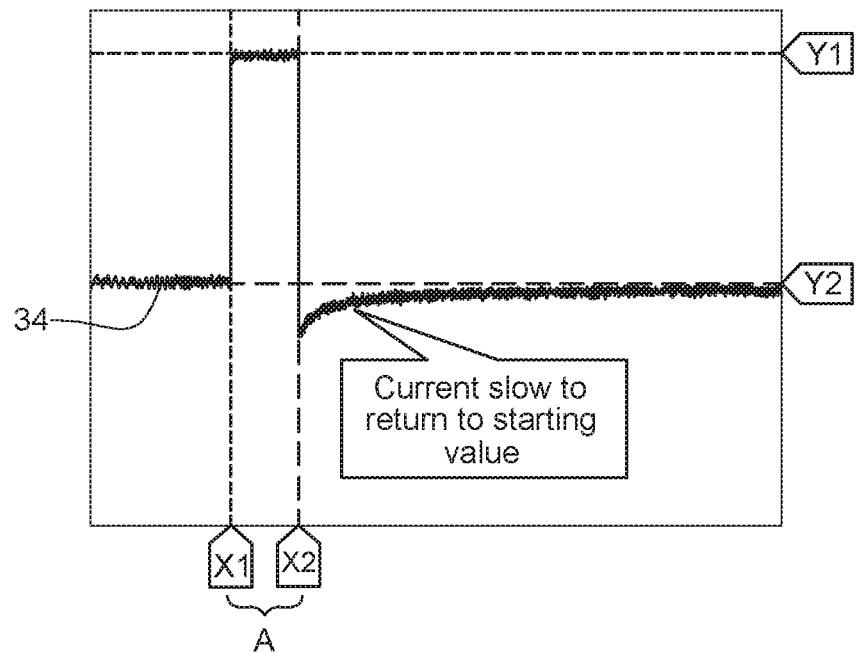
FIG. 2a shows a plot of the pump current through a one-cell sensor against time before, during and after a diagnostic process.

FIG. 2a shows a plot of the pump current 34 through a one-cell sensor against time before, during, and after the diagnostic process; the timespan of the diagnostic process is shown with reference A. As can be seen, the pump current is slow to return to its starting value.

Figure 2B:
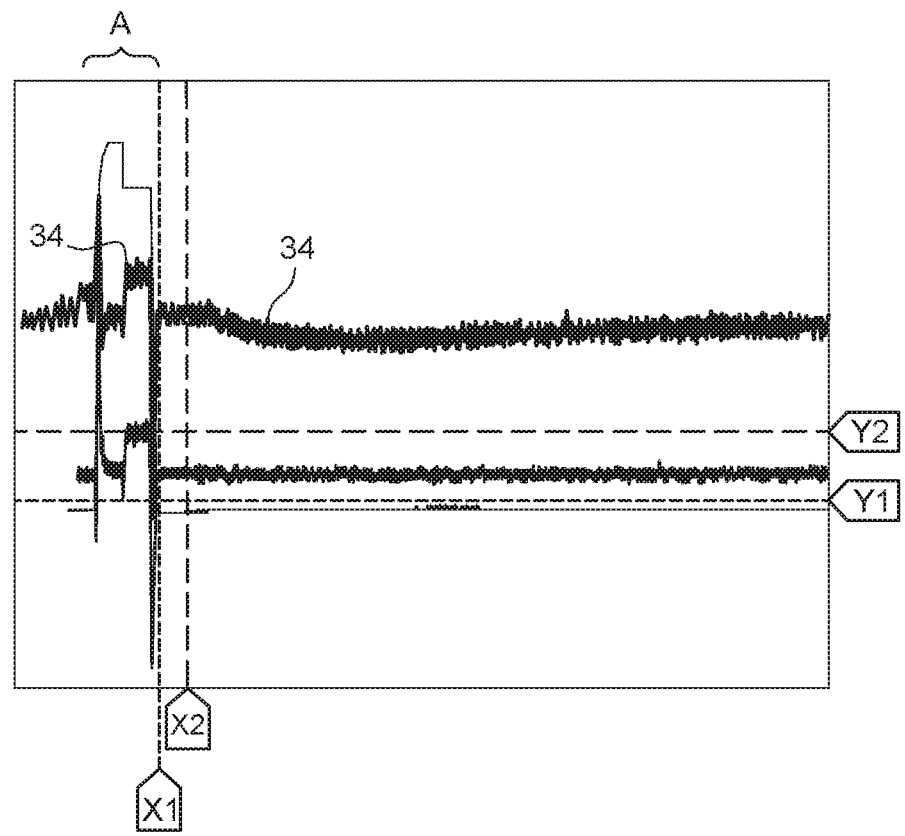
FIG. 2b shows a plot of the pump current through a two-cell sensor against time before, during and after a diagnostic process.

FIG. 2b shows the pump current 34 though a two-cell sensor before, during and after the diagnostic process; the timespan of the diagnostic process is shown with reference A. The pump current is slow to return to its starting value.

Invention

While the pump loop is opened during the diagnostic process, the pump is no longer receiving the current it requires to maintain the reference cell at the desired 450 mV. This will cause the reference cell to drift from its desired value in a direction dependent on the oxygen content in the exhaust gas causing the sensor to become out of balance. After the diagnostic is complete, the loop is closed again, but the error accumulated on the cells during the diagnostic causes a disturbance in the control loop.

Figure 3A:
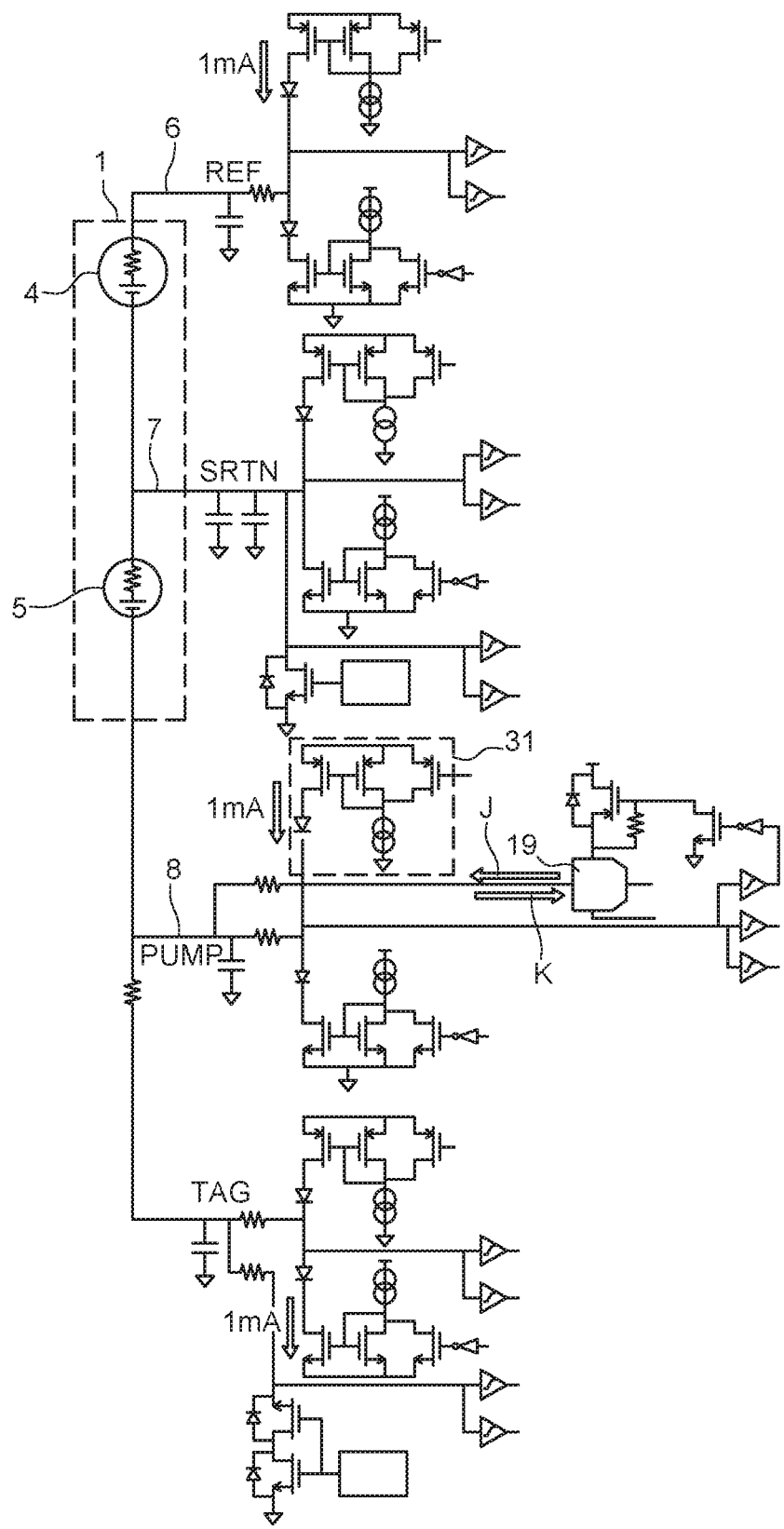

FIGS. 3a and 3b illustrate examples of the invention. The circuitry may be the same generally as in FIGS. 1a and 1b respectively. Here there is some modified circuitry which is used to solve other problems caused by the diagnostic process which is the subject matter of the Applicant's co-pending application. The circuitry is similar and like reference numerals designate the like component of referenced in FIGS. 1a and b; it has been modified with additional circuit components to overcome certain other problems resulting from the diagnostic process, but to implement aspects of the invention it is not necessary to add additional hardware/components and the circuitry of FIG. 1 can also be used to implement the invention.

In order to rectify this, methodology is applied. The methodology according to examples of the invention to rectify the aforesaid problems may be incorporated into e.g. programmed into e.g. a digital controller within the interface IC.

In basic methodology, essentially additional current is pumped into or out of the pump cell for a short period after the diagnostic, in order to rebalance the sensor. This is shown by arrows J (pumping current to pump cell 5 on PUMP line 8) and arrow K (pumping current from pump cell 5 on PUMP line 8). This can be implemented using a suitably programmed digital controller within the interface IC which is connected to the DAC 19.

In one example of the methodology, the magnitude (i.e. value) of pump current flowing through the sensor prior to the diagnostic step is measured (which is typically performed as part of the sensor measurement strategy) and then is saved (i.e. stored). This pump current is the current supplied to the pump cell on line 8 in order to regulate the control loop. During the subsequent diagnostic steps, the balance of the sensor is disrupted and the sensor operates in open loop control, i.e. is not controlled in a closed-loop regime such that the pump cell is not pumped with the requisite current to maintain the reference cell at the requisite 450 mA. The problem is particularly pronounced if the A/F ratio is not stoichiometric.

According to examples, after the diagnostic process, an (additional) balancing current is applied to the pump cell (PUMP line 8) via the DAC 19 for a period of time to bring the sensor back into equilibrium quickly. The balancing current may be pumped into or out of the cell, i.e. may be in either direction as shown by the arrows J and K in the figures.

The time duration and/or the magnitude of the balancing current may be selected dependent on the amount of time the loop was opened.

In one example, the balancing current, of twice the stored magnitude, is applied to the pump cell 5 for the same amount of time the loop was opened. This restores the charge that should have been supplied to the pump cell during the diagnostic interval along with the supplying the pump current needed during this charge balancing time.

So therefore, preferably, the following equation applies:

$$I_{bal} \times T_{bal} = I_{meas} \times (T_{open} + T_{bal})$$

where $I_{bal}$=balancing current;
$T_{bal}$=balancing current time duration;
$I_{meas}$=measure stored current (prior to diagnostic); and
$T_{open}$=time the loop was opened.

So, for example the balancing current of twice the stored measured magnitude, is applied to the pump cell for the same amount of time the loop was opened. This restores the charge that should have been supplied to the pump cell during the diagnostic interval as well as the current that is needed during the balancing current time duration.

It is to be noted that the compensating current may be such that it needs to flow in either direction as shown by the arrows J, K in FIGS. 3a and 3b.

Figure 4A:
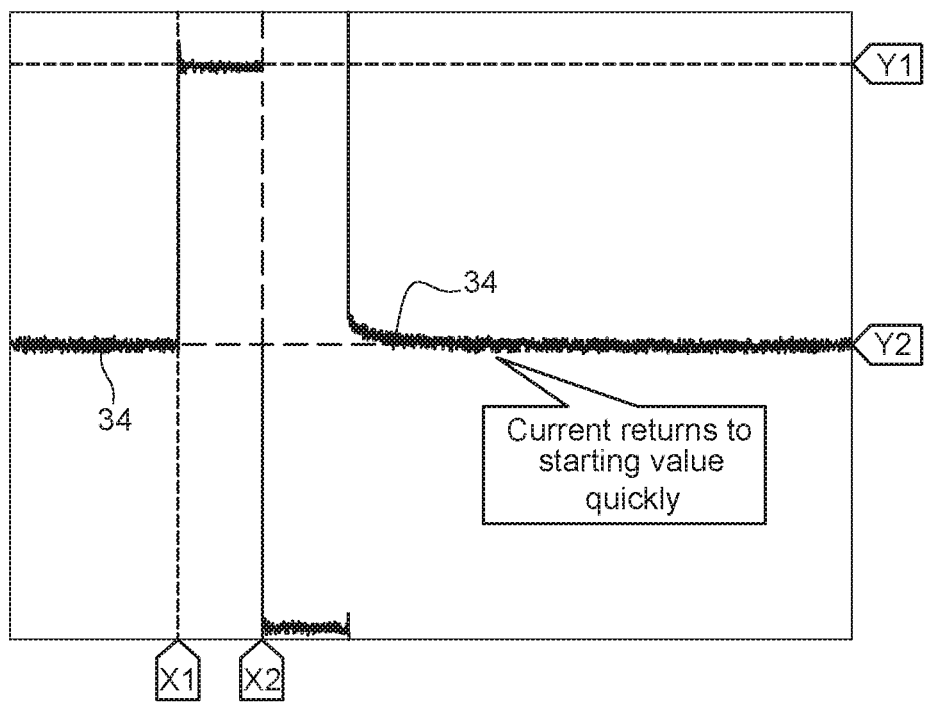
FIGS. 4a and 4b show plots similar to FIGS. 3a and 3b of the current flowing through the respective sensor cell but where the invention is implemented.

FIG. 4a shows a plot similar to FIG. 2a of the current flowing through the one sensor cell but where the invention is implemented. After the diagnostic step, the pump cell charge balancing current is supplied at a constant rate for a short period T (balancing current time interval) after which the current returns to the starting value quickly.

Figure 4B:
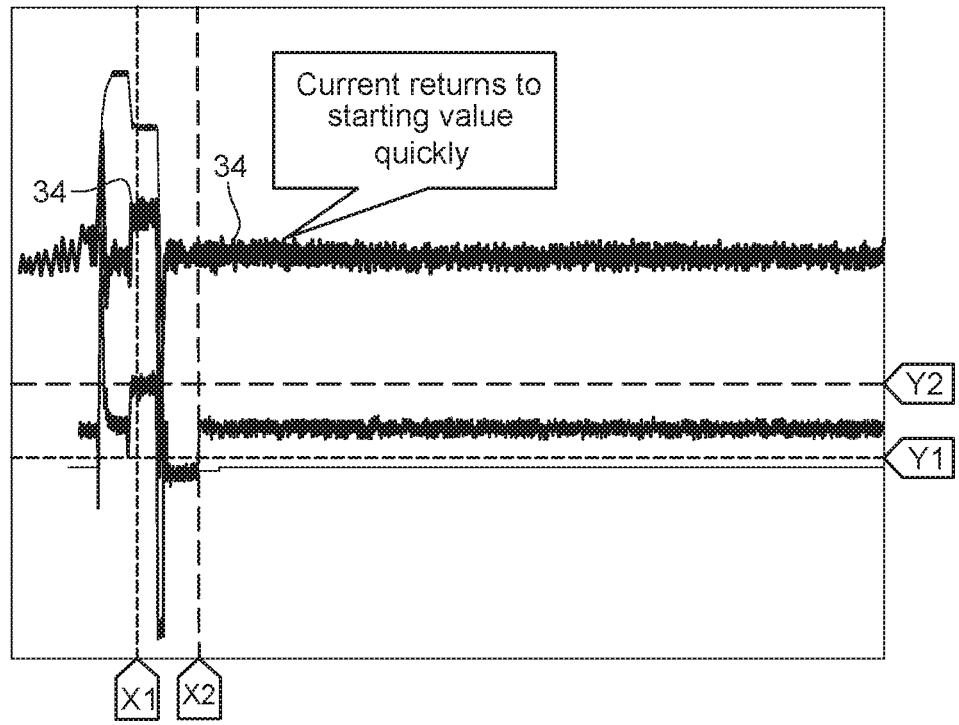

FIG. 4b shows a plot similar to FIG. 2b of the current flowing through the two-cell sensor's pump cell 5 but where the invention is implemented. After the diagnostic step, the pump charge balancing current is supplied at a constant rate for a short period T, after which the current returns to the starting value quickly.

We claim:

1. A method of controlling an oxygen sensor in a system including compensator circuitry connected to the oxygen sensor, said oxygen sensor including a pump cell, said compensator circuitry including a feedback control loop which includes a digital compensator configured to determine and output a compensation current to said pump cell or adjust a pump cell voltage, said method comprising:
    subsequent to a period of time when the feedback control loop is disrupted, pumping a balancing current into or out said pump cell for a balancing time interval, said balancing current and/or said balancing time interval being dependent on a current pumped into or out of said pump cell prior to said feedback control loop being disrupted.

2. A method as claimed in claim 1, wherein said oxygen sensor is a two-cell sensor which includes said pump cell and a reference cell, said feedback control loop is configured to maintain the reference cell at a reference voltage, said digital compensator is configured to determine and output the compensation current to said pump cell dependent on the reference voltage measured from said reference cell.

3. A method as claimed in claim 1, wherein said oxygen sensor is a single-cell sensor, and said feedback control loop is adapted to adjust the pump cell voltage dependent on a measured pump cell current.

4. A method as claimed in claim 1, including measuring or estimating the current being pumped into or out of said pump cell prior to said feedback control loop being disrupted.

5. A method as claimed in claim 4, including storing the measured or estimated current.

6. A method as claimed in claim 1, wherein said feedback control loop being disrupted is a scheduled disruption for diagnostic testing.

7. A method as claimed in claim 1, wherein the balancing current and/or the balancing time interval is/are selected according to the following equation:

$$0.5 \times I_{bal} \times T_{bal} = I_{meas} \times T_{open}$$

where $I_{bal}$ is the balancing current, $T_{bal}$ is the balancing time interval, $I_{meas}$ is the current pumped into or out of said pump cell prior to said feedback control loop being disrupted and $T_{open}$ is the period of time when the feedback control loop is disrupted.

8. A method as claimed in claim 7 wherein, said balancing current, and the balancing time interval, is determined by the digital compensator.

9. A system comprising:
    an oxygen sensor including a pump cell; and
    compensator circuitry connected to said oxygen sensor, and including a feedback control loop which includes a digital compensator configured to determine and output a compensation current to said pump cell or adjust a pump cell voltage,
    wherein said compensator circuitry includes a digital controller configured to, subsequent to a period of time when the feedback control loop is disrupted, pump a balancing current into or out said pump cell for a balancing time interval, said balancing current and/or said balancing time interval being dependent on a current pumped into or out of said pump cell prior to said feedback control loop being disrupted.

10. A system as claimed in claim 9, wherein said oxygen sensor is a two-cell sensor which includes said pump cell and a reference cell, said feedback control loop is configured to maintain the reference cell at a reference voltage, and said digital compensator is configured to determine and output the compensation current to said pump cell dependent on the reference voltage measured from said reference cell.

11. A system as claimed in claim 9, wherein said oxygen sensor is a single-cell sensor, and said feedback control loop is adapted to adjust the pump cell voltage dependent on a measured pump cell current.

12. A system as claimed in claim 9, wherein said digital controller is configured to measure or estimate the current being pumped into or out of said pump cell prior to said feedback control loop being disrupted.

13. A system as in claim 12, wherein said digital controller is configured to store the measured or estimated current being pumped into or out of said pump cell prior to said feedback control loop being disrupted.

14. A system as claimed in claim 9, wherein said feedback control loop being disrupted is a scheduled disruption for diagnostic testing.

15. A system as claimed in claim 9, wherein said digital controller is configured to select the balancing current and/or the balancing time interval according to the following equation:

$$0.5 \times I_{bal} \times T_{bal} = I_{meas} \times T_{open}$$

where $I_{bal}$ is the balancing current, $T_{bal}$ is the balancing time interval, $I_{meas}$ is the current pumped into or out of said pump cell prior to said feedback control loop being disrupted and $T_{open}$ is the period of time when the feedback control loop is disrupted.

16. A system as claimed in claim 15, wherein the digital compensator is configured to determine the balancing current and the balancing time interval.

* * * * *

UNITED STATES PATENT AND TRADEMARK OFFICE
CERTIFICATE OF CORRECTION

PATENT NO. : 11,353,420 B2
APPLICATION NO. : 16/599663
DATED : June 7, 2022
INVENTOR(S) : Mark W. Gose et al.

Page 1 of 1

It is certified that error appears in the above-identified patent and that said Letters Patent is hereby corrected as shown below:

In the Claims

Column (7), Line (20), in Claim 13, delete "as" and insert --as claimed--.

Signed and Sealed this
Sixteenth Day of August, 2022

*Katherine Kelly Vidal*

Katherine Kelly Vidal
*Director of the United States Patent and Trademark Office*